United States Patent [19]
Bailey et al.

[11] Patent Number: 4,690,455
[45] Date of Patent: Sep. 1, 1987

[54] INFANT SEAT FOR AUTOMOBILES

[76] Inventors: Randal N. Bailey, 6011 Fox Chase Cir., Shreveport, La. 71106; Purvis J. Crews, 4025 Marion Pl., Shreveport, La. 71109

[21] Appl. No.: 860,896

[22] Filed: May 8, 1986

[51] Int. Cl.$^4$ ............................................. A47C 15/00
[52] U.S. Cl. .................................. 297/238; 297/117; 297/191
[58] Field of Search ................ 297/238, 117, 191, 467

[56] References Cited

U.S. PATENT DOCUMENTS

| 2,966,201 | 12/1960 | Strahler | 297/238 |
|---|---|---|---|
| 3,912,328 | 10/1975 | Tanaka | 297/467 |
| 3,951,450 | 4/1976 | Gambotti | 297/238 |
| 4,540,216 | 9/1985 | Hassel, Sr. | 297/238 |

FOREIGN PATENT DOCUMENTS

| 2720954 | 10/1977 | Fed. Rep. of Germany | 297/238 |
|---|---|---|---|
| 2307673 | 11/1976 | France | 297/238 |

Primary Examiner—James T. McCall
Attorney, Agent, or Firm—John M. Harrison

[57] ABSTRACT

An infant seat for automobiles which includes a folding support hinged to a frame located in the bench seat or bucket seat backrest of an automobile and designed to support an infant or child when positioned in extended configuration. Flexible side flaps are attached to each side of the support and extend upwardly to the automobile seat backrest in order to stabilize the head and shoulders of an infant or child seated on the support. Crotch and shoulder straps extend from a point of anchor at the support through a back support flap or partition located between the infant seat and the seat backrest, to second points of anchor at the seat frame and the vehicle frame, in order to secure the infant or child in position on the support. When not in use, the support is foldable along with the flexible side flaps into the backrest to facilitate accommodation of an adult in conventional fashion on the automobile seat.

15 Claims, 4 Drawing Figures

U.S. Patent  Sep. 1, 1987  4,690,455
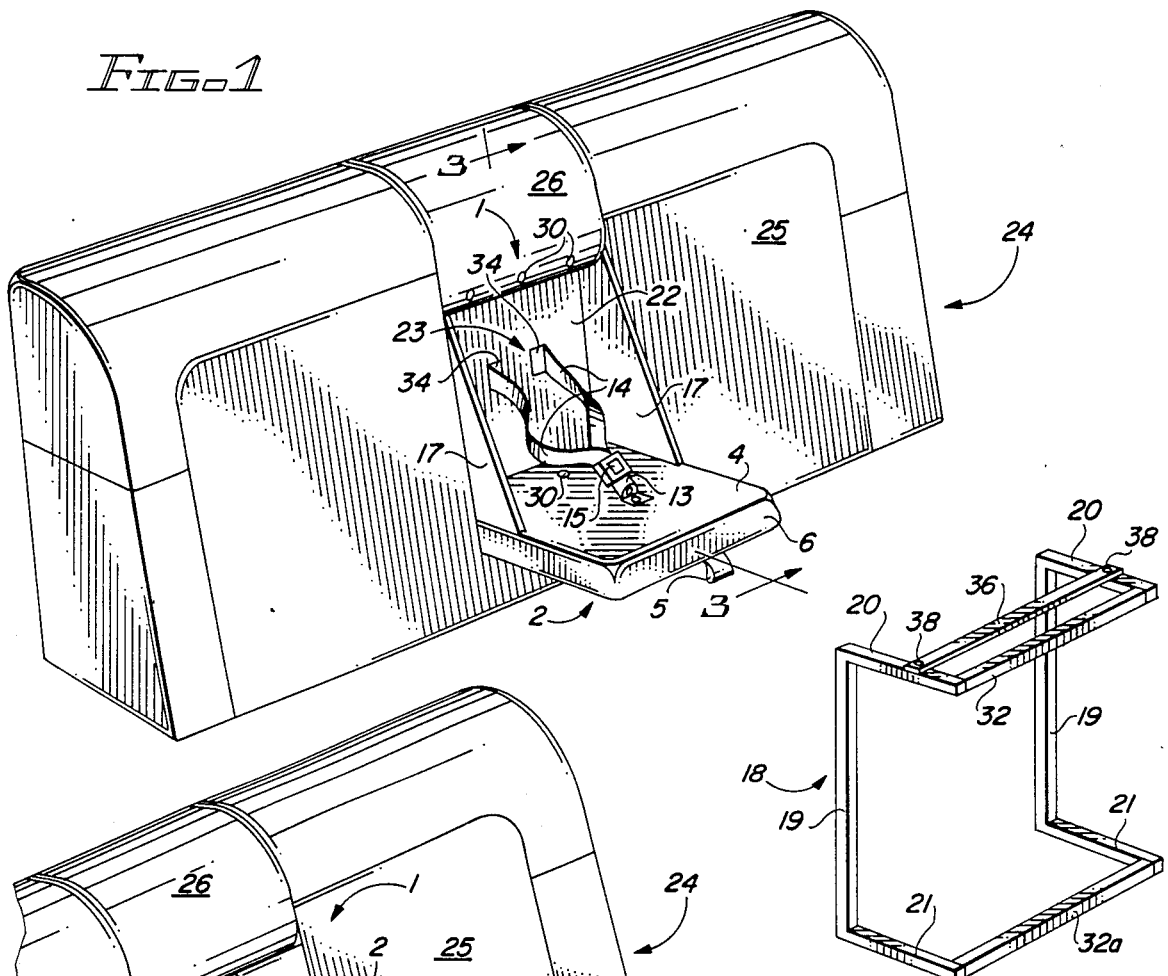
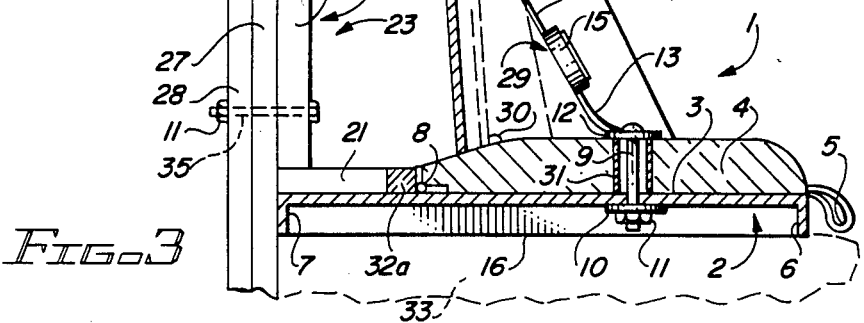

INFANT SEAT FOR AUTOMOBILES

BACKGROUND OF THE INVENTION

1. Field of the Invention

This invention relates to vehicle seats for infants and children and more particularly, to an infant car seat which is characterized by a support hingedly attached to a frame located in the backrest of either a bucket seat or a bench seat in an automobile or other vehicle and designed to support an infant or child when in extended configuration. The infant seat support is also designed to recess into the backrest of the automobile seat when the infant seat is not in use, in order to accomodate an adult in conventional fashion. The infant seat is fitted with a pair of flexible, parallel side flaps for stabilizing the head and shoulders of an infant and with crotch and shoulder straps extending from anchor points at the vehicle frame and the folding support, for securing the infant firmly yet comfortably in position on the folding support.

One of the problems associated with the use of portable seats and similar structures known as "car seats" for carrying infants and children in vehicles, is that of properly supporting and stabilizing the seats on the front or rear seats of a vehicle. Typically, straps, bars, belts, harnesses and restrainsts of various description are used to engage the vehicle seats and the infant car seat in order to immobilize or at least partially stabilize the infant car seats, such that children can be placed in, transported, and removed from the seats at the convenience of their parents or custodian with at least some degree of security. A disadvantage found in infant car seats and carriers of this design is the requirement of periodically tightening the straps or harnesses to secure the seats in place and subsequently loosening the restraints to remove the seats when it is desired to provide room for one or more additional adults. Furthermore, under circumstances of severe braking or acceleration of the vehicle, the straps and securing harnesses of the infant car seat or carrier sometimes work loose and allow the seat to fall forward or sideways while the vehicle is in motion, sometimes resulting in injury to the infant or child. This problem is intensified under circumstances where the straps or harnesses are periodically loosened to remove the carrier from the vehicle. The problem has become so acute that legislation requiring that children and infants be secured in a properly designed infant car seat or carrier has recently been enacted. The laws and regulations for vehicle or infant car seats or carriers for children prescribe several features which have long been regarded as necessary. These features include a secure anchor to the frame of the car, a secure guard or harness encircling the child's upper body and a guard or harness positioned to receive the impact of the child's face in the event of rapid deceleration. These special features have proved to be disadvantageous, from a design standpoint, in that they mandate the design of a cumbersome and bulky carrier seat which is awkward to handle between use, either occupying space on the seat of the vehicle or requiring storage in the trunk or at some other location in the vehicle.

2. Description of the Prior Art

Various types of removable or foldable vehicle seats are known in the art. Among these is the "Infants Convertible Seat and Bed," disclosed in U.S. Pat. No. 2,584,481, dated Feb. 5, 1952, to G. M. Mast, et, al. This patent details an attachment for an adult vehicle seat which attachment includes, in foldable position, a part of the adult seat backrest and in extended position, constitutes a chair for an infant. The chair includes a seat portion, a back portion and arm rests which, when folded, occupy positions at the sides of the seat portion to complete the back portion of the adult seat. The seat portion includes a main supporting shaft, about the axis of which the infant seat turns with arms pivotedly mounted on the shaft at one end and the arm rests centrally and pivotedly connected at the second end of the arms. The arm rests are also slidably and pivotedly connected at one end to the adult seat back, in order to facilitate folding of the structure with the arm rests beside the infant seat, wherein the seat forms a part of the adult seat back. An "Automobile Seat and Cradle" is disclosed in U.S. Pat. No. 2,966,201, dated Dec. 27, 1960, to L. W. Strahler. The Strahler patent discloses a folding member which is designed to recess in the backrest of a conventional automobile seat when not in functional use as a seat or cradle. When the folding member is pivoted into extended configuration outwardly of the seat back rest and resting on the bench seat, it is designed to receive an infant and is provided with straps for holding the infant inside a cradle cavity formed therein. When not in use, the pivoting cradle seat is folded upwardly into the automobile backrest to accomodate an adult in conventional fashion, U.S. Pat. No. 4,533,176, dated Aug. 6, 1985, to Bill Wyttenbach, entitled "Built-In Automatic Infant Restraint Seat" discloses a combination child seat and adult seat for use in a vehicle. The infant seat of this invention includes a vehicle seat, a backrest frame and a hinged contact portion pivotally secured to the backrest frame for receiving and contacting the body of a seated adult. Also included is a child seat which is hinged to the backrest frame between the backrest frame and the contact portion. A restraining bar or belt is attached to the child seat and extends to the backrest frame, and the child seat is foldable to a first position wherein the restraining members and the child seat are concealed by the contact portion of the seat. The vehicle seat is suitable for occupancy by an adult while the child seat is in this position. The child seat is also movable to a second position where it is accessible and available for use by a small child and the restraining bars or belts are suitable for restraining a child in the child seat against substantial impact forces. A "Convertible Seat For Vehicles" is disclosed in U.S. Pat. No. 4,540,216, dated Sept. 10, 1985, to Karl D. Hassle, Sr. The Hassle convertible seat is foldable and located within a conventional vehicle seat backrest in a vehicle, providing the usual seat appearance in a first configuration. When the convertible seat is unfolded, it provides a simply constructed child safety seat within the adult seating area and incorporates several safety features for protecting a child seated therein.

Another problem associated with conventional infant and child car seats and particularly, those infant car seats which are built into existing automobile bench or bucket seats, is complexity in design, which frequently results in a bulky seat design which is difficult to use. Still another problem is a lack of facility for using the automobile seat for both adult seating and child seating as necessary. Yet another problem realized in many of the convertible infant and child car seats known in the art is the lack of facility for using these seats to seat infants or very small children who do not yet possess full muscle control and must therefore normally be placed in an infant seat of more elaborate design, for security.

Accordingly, it is an object of this invention to provide a new and improved child or infant seat for automobiles, which seat is capable of extension from the automobile seat backrest to receive a small infant or child and retraction in the backrest when not in use, to facilitate seating of an adult in conventional fashion.

Another object of this invention is to provide a simple and yet functional infant seat for automobiles, which seat is pivotedly attached to the backrest of a conventional automobile bench or bucket seat and is provided with side flaps for stabilizing an infant or child while the infant is strapped in the seat in deployed configuration. The infant seat is capable of being folded into the backrest when not is use, to accomodate an adult in conventional fashion.

Still another object of this invention is to provide a new and improved infant seat for automobiles, which seat is foldable on a frame into the backrest of a bucket or bench seat in an automobile when not in use and is characterized by a folding support, shoulder and crotch straps, side flaps and an alternative back support flap for supporting an infant and securing the infant in a sitting position while travelling.

SUMMARY OF THE INVENTION

These and other objects of the invention are provided in a new and improved infant seat for automobiles, which infant seat is characterized by a support hinged to a box-like frame mounted in the backrest of a bucket or bench seat and foldable into a recess provided in the backrest when not in use, to facilitate seating of an adult in conventional fashion, which support is also foldable downwardly from the backrest to receive an infant or child when in functional configuration, the infant seat further provided with shoulder and crotch straps and side flaps for stabilizing an infant in a seated position in the infant seat during travel.

BRIEF DESCRIPTION OF THE DRAWING

The invention will be better understood by reference to the accompanying drawing, wherein:

FIG. 1 is a perspective view of a preferred design of the infant seat mounted in the backrest of a bench seat of an automobile and deployed in functional configuration;

FIG. 2 is a perspective view of the infant seat illustrated in FIG. 1 in retracted, non-functional configuration;

FIG. 3 is a sectional view of the infant seat illustrated in FIG. 1, taken along line 3—3, more particularly illustrating a preferred construction for the infant seat; and FIG. 4 is a perspective view of a preferred frame for the infant seat.

DESCRIPTION OF THE PREFERRED EMBODIMENTS

Referring to FIGS. 1, 3 and 4 of the drawing the infant seat of this invention is generally illustrated by reference numeral 1. The infant seat 1 is mounted in the backrest 25 of a conventional bench seat 24, provided with a bench seat support 33, as illustrated in FIG. 3. The infant seat 1 includes a pivoting support 2, which is characterized by a support plate 3, fitted with support padding 4 and a thin bottom cover 16, as illustrated in FIG. 3: A pull strap 5 extends from the strap end 6 of the support plate 3, in order to facilitate retraction and extension of the support 2, as hereinafter further described. The base end 7 of the support plate 3 is located in a recess 23 provided in the backrest 25 of the conventional bench seat 24 and rests against the car seat frame 27, when the support 2 is extended, as illustrated. As illustrated in FIGS. 3 and 4 the support plate 3 of the support 2 is hingedly attached to the bottom cross-brace 32a, extending between parallel bottom braces 21, which project from the vertical braces 19 of the seat frame 18, in order to securely and pivotally mount the support 2 on the seat frame 18 when the support 2 is in both retracted or folded and extended configuration. When positioned in folded configuration in the recess 23, the strap end 6 of the support plate 3 and the pull strap 5 lie adjacent the top cross-brace 32, which extends from rigid attachment to the top braces 20 in the seat frame 18. In a preferred embodiment of the invention the top braces 20 and bottom braces 21 in the seat frame 18 project from the vertical braces 19 in parallel relationship and receive the top cross-brace 32 and bottom cross-brace 32a to define the recess 23 and the vertical braces 19 are bolted to the car seat frame 27 and the vehicle frame 28 by means of frame mount bolts 35 and cooperating nuts 11. In another preferred embodiment of the invention a piano hinge 8 is used to connect the support plate 3 of the support 2 to the bottom cross-brace 32a, in order to enhance the strength of the hinging function.

Referring now to FIGS. 3 and 4 of the drawing, in a most preferred embodiment of the invention the seat frame 18 is secured in the backrest 25 of the bench seat 24 by means of the frame bolts 35 and seat belt bolts 9 and includes a pair of vertically oriented, parallel vertical braces 19, from which the top braces 20 and bottom braces 21 extend in parallel fashion, respectively. The top cross-brace 32 and bottom cross-brace 32a connect the extending ends of the top braces 20 and bottom braces 21, respectively, as illustrated, to form a rigid frame for mounting the support 2. A mount bar 36 is connected to the top braces 20 by means of the mount bar bolts 38, as illustrated in FIG. 4.

As illustrated in FIGS. 1 and 3, the crotch strap 13 of a seat belt 29 is connected to the support plate 3 by means of a shim 31, seat belt bolt 9 extending through the shim 31, a washer 10 and a cooperating nut 11. The shoulder straps 14 of the seat belt 29 project through slots 34 in the back support flap 22 and are secured by means of a belt plate 12 and additional seat belt bolts 9 and cooperating nuts 11 to the vertical braces 19 of the seat frame 18, the car seat frame 28 and the vehicle frame 28, for additional security. The buckle 15, attached to the crotch strap 13, connects the leg strap 13 to the shoulder straps 14, by means of a lock plate (not illustrated), in order to facilitate placing an infant or child in and removing the infant or child from the infant seat 1. In yet another most preferred embodiment of the invention, a pair of side flaps 17 are provided on each side of the support 2 in order to help stabilize and support an infant's head and shoulders during travel. Each side flap 17 extends from a first line of attachment at the support plate 3 to a secodn line of attachment to the backrest 25 of the bench seat 24. The side flaps 17 are flexible and resilient in construction, in order to facilitate folding into the recess 23 when the support 2 of the infant seat 1 is retracted into folded configuration, as hereinafter described. A back support flap 22 serves to support the back of an infant or child seated in the infant seat 1 and the center panel 26 of the backrest 25 can be manufactured of desired thickness to shield the head of the infant when the infant is placed in the infant seat 1. In a most preferred embodiment of the invention the thickness of the center panel 26 from top to bottom is chosen to facilitate recessing of the head of an infant beneath the center panel 26 in the recess 23 and against the back support flap 22, when the infant is sitting comfortably on the support padding 4 of the support 2. In another preferred embodiment of the invention one edge of the back support flap 22 is looped over the top cross-brace 32 and around the mount bar 36 and is sewn in place, as illustrated in FIG. 3. The opposite edge of the back support flap 22 is sewn to the support padding 4. An outer back support flap 37 (illustrated in phantom) can be installed outwardly of the seat frame 18 and the inner back support flap 22 and secured to female snaps (not illustrated) located on the support padding 4 and in the center panel 26, respectively, in order to facilitate use of the center panel 26 as a headrest for larger children and infants. For example, as further illustrated in FIG. 3, under circumstances where it is desired to accomodate a larger child or infant in the infant seat 1, the outer back support flap 37 can be moved outwardly of the seat frame 18 and the back support flap 22, by attaching the male snaps 30, located on the edges of the outer back support flap 37, to the corresponding rows of female snaps located in the center panel 26 and support padding 4, to more comfortably seat the larger child. In yet another preferred embodiment of the invention the shoulder straps 14 project through the slots 34 in the back support flap 22 and extend alongside the back support flap 22 around the top cross-brace 32 to points of anchor at the seat belt bolts 9, as illustrated in FIG. 3.

Referring again to FIGS. 1-3 of the drawings, when it is desired to recess the support 2 of the infant seat 1 into the back rest 25 and accomodate several adults on the bench seat support 33, the pull strap 5 is used to rotate the support 2 on the piano hinge 8 and locate the support 2 in the recess 23 as illustrated in FIG. 2. When the support 2 is thusly retracted in the backrest 25, the bench seat 24 is available to accomodate the adults in conventional, comfortable fashion. The infant seat 1 is easily deployed for functional use by again grasping the pull strap 5 and rotating the support 2 downwardly on the piano hinge 8 to extend the support 2 from the recess 23 parallel to the bench seat support 33, as illustrated in FIGS. 1 and 3. An infant is then placed in the infant seat 1 by manipulating the buckle 15 to separate the crotch strap 13 from the shoulder straps 14, seating the infant on the support padding 4 in the support 2 and reattaching the buckle 15 to secure the infant between the side flaps 17. If the infant is very small with little muscle control, the head of the infant is prevented from extreme motion to the right or left by the presence of the side flaps 17, and contact between the top of the infant's head and the center panel 26 serves to minimize forward and rearward motion of the head during travel. If a larger child is to be placed in the infant seat 1, the outer back support flap 37 is snapped in position between the center panel 26 and the support padding 4, as heretofore described and as illustrated in phantom in FIG. 3, and the center panel 26 then serves as a head rest and support.

It will be appreciated by those skilled in the art that the infant seat of this invention affords a simple, yet highly expedient and efficient means for securing an infant or child in the backrest of either a bench or bucket seat of an automobile. Materials of construction are largely a matter of choice, although in a preferred embodiment of the invention the back support flap 22 is constructed of reinforced canvas and the side flaps 17 and support padding 4 are designed to match the material used to cover the backrest 25 and bench seat support 33. Furthermore, it is understood that conventional seat belt retractors (not illustrated) can be installed in the shoulder straps 14, where the use of such retractors is allowed by law. The infant seat of this invention is easy to deploy and retract when not in use to accomodate an adult in comfortable, conventional fashion. Furthermore, the infant seat 1 can be adapted to accomodate large or small infants by simply adding the outer back support flap 37 as above described, to facilitate use of the center panel 26 as either a head rest or a head shield and support, depending upon the size of the infant placed in the infant seat.

Yet another expedient of the infant seat is the capacity for building the seat frame 18 into the back rest 25 and subsequently adding the support 2, in an assembly-line procedure. Accordingly, the support 2 can be quickly and easily installed in the seat frame 18 by attaching the piano hinge 8 to the support plate 3, looping the shoulder straps 14 over the top cross-brace 32 and connecting the ends to the vertical braces 19 and sliding the mount bar 36 through the loop in the inner back support flap 22 and securing the mount bar 36 to the top cross-brace 32 by means of the mount bar bolts 38. The side flaps 17 can be pre-stitched to the back rest 25 and then to the support 2.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. An infant seat for automobilies comprising frame means disposed in the backrest of an automobile seat; a support hingedly carried by said frame means, wherein said support is selectively retractable in the backrest in a first orientation and deployed from the backrest in a second orientation; restraint means extending from a first point of attachment in said support to second points of attachment in said frame means; a first flexible side flap extending between one side of said support and the backrest of the automobile seat and a second flexible side flap extending between the opposite side of said support and the backrest of the automobile seat, said first flexible side flap and said second flexible side flap foldable in the backrest with said support when said support is retracted in said first orientation; and a first back support flap provided in recessed relationship inside the backrest of the automobile seat for supporting the back of the infant.

2. The infant seat of claim 1 wherein said frame means is further characterized by a pair of vertical braces disposed in substantially parallel, vertical relationship and attached to the backrest; a pair of bottom braces projecting from the ends of said vertical braces, respectively, in substantially parallel relationship and a bottom cross-brace connecting the extending ends of said bottom braces; a pair of top braces projecting from the opposite ends of said vertical braces, respectively, in substantially parallel relationship and a top cross-brace connecting the extending ends of said top braces; and wherein said support is hingedly attached to said bottom cross-brace.

3. The infant seat of claim 1 wherein said restraint means is further characterized by a crotch strap having one end secured to said support and the opposite end of said leg strap provided with a buckle; a pair of shoulder straps with one end of said shoulder straps joined together and provided with a lock plate and the opposite ends of said shoulder straps attached to said frame, wherein said lock plate engages said buckle to secure the infant on said support.

4. The infant seat of claim 1 wherein:
   (a) said frame means is further characterized by a pair of vertical braces disposed in substantially parallel, vertical relationship; and attached to the backrest; a pair of bottom braces projecting from the ends of said vertical braces, respectively, in substantially parallel relationship and a bottom cross-brace connecting the extending ends of said bottom braces; a pair of top braces projecting from the opposite ends of said vertical braces, respectively, in substantially parallel relationship and a top cross-brace connecting the extending ends of said top braces; and wherein said support is hingedly attached to said bottom cross-brace; and
   (b) said restraint means is further characterized by a crotch strap having one end secured to said support and the opposite end of said crotch strap provided with a buckle; a pair of shoulder straps with one end of said shoulder straps joined together and provided with a lock plate and the opposite ends of said shoulder straps extending over said top cross-brace and attached to said frame, wherein said lock plate engages said buckle to secure the infant on said support.

5. The infant seat of claim 1 further comprising a pull strap attached to said support for selectively pivoting said support into said first orientation and said second orientation.

6. The infant seat of claim 2 further comprising a piano hinge having a first hinge bracket attached to said bottom cross-brace and a second hinge bracket attached to said support along a line substantially parallel to and spaced from the ends of said support, whereby said support engages said bottom braces and said bottom cross-brace in said seat frame when said support is extended outwardly of the backrest of the automobile seat into said second orientation.

7. The infant seat of claim 6 further comprising a second back support flap disposed between said support and said backrest, male snaps provided on both ends of said second back support flap and female snaps provided on said support and the backrest, whereby said second back support flap is selectively and removably positioned between said support and the backrest.

8. An infant seat for securing a child in an automobile, comprising:
   (a) a frame disposed in a recess located in the backrest of an automobile seat;
   (b) a generally rectangular-shaped support positioned beneath said frame;
   (c) hinge means connecting said support to said frame, wherein said support is foldable into said recess against said frame in a first configuration and from said recess in a second configuration;
   (d) a first flexible side flap attached to one side of said support and the backrest and a second flexible side flap attached to the opposite side of said support and the backrest, said first flexible side flap and said second flexible side flap adapted for folding inside said recess when said support is pivoted inside said recess in said first configuration;
   (e) a first back support flap provided in recessed relationship inside the backrest of the automobile seat for supporting the child; and
   (f) seat belt means extending from a first point of attachment to said support through said back support flap to at least one second point of attachment to said frame.

9. The infant seat of claim 13 wherein said frame is further characterized by a pair of vertical braces disposed in substantially parallel, vertical relationship and attached to the backrest; a pair of bottom braces projecting from the ends of said vertical braces, respectively, in substantially parallel relationship and a bottom cross-brace connecting the extending ends of said bottom braces; a pair of top braces projecting from the opposite ends of said vertical braces, respectively, in substantially parallel relationship and a top cross-brace connecting the extending ends of said top braces; and wherein said support is hingedly attached to said bottom cross-brace.

10. The infant seat of claim 8 wherein said seat belt means is further characterized by a crotch strap having one end secured to said support and the opposite end of said leg strap provided with a buckle; a pair of shoulder straps with one end of said shoulder straps joined together and provided with a lock plate and the opposite ends of said shoulder straps extending around said top cross-brace and attached to said frame, wherein said lock plate engages said buckle to secure the infant on said support.

11. The infant seat of claim 8 wherein:
   (a) said frame means is further characterized by a pair of vertical braces disposed in substantially parallel, vertical relationship and attached to the backrest; a pair of bottom braces projecting from the ends of said vertical braces, respectively, in substantially parallel relationship and a bottom cross-brace connecting the extending ends of said bottom braces; a pair of top braces projecting from the opposite ends of said vertical braces, respectively, in substantially parallel relationship and a top cross-brace connecting the extending ends of said top braces; and wherein said support is hingedly attached to said bottom cross-brace; and
   (b) said seat belt means is further characterized by a crotch strap having one end secured to said support and the opposite end of said crotch strap provided with a buckle; a pair of shoulder straps with one end of said shoulder straps joined together and provided with a lock plate and the opposite ends of said shoulder straps extending around said top cross-brace and attached to said frame, wherein said lock plate engages said buckle to secure the infant on said support.

12. The infant seat of claim 11 wherein said hinge means is a piano hinge having a first hinge bracket attached to said bottom cross-brace and a second hinge bracket attached to said support along a line substantially parallel to and spaced from the ends of said support, whereby said support engages said bottom braces and said bottom cross-brace in said seat frame when said support is extended outwardly of the backrest of the automobile seat into said second orientation.

13. The infant seat of claim 12 further comprising a second back support flap disposed between said support and said backrest, first snap means located on said support and the backrest and second snap means located on the ends of said second back support flap, whereby said second back support flap is selectively deployed between said support and the backrest of the automobile seat.

14. An infant seat for securing a child to the backrest of an automobile seat comprising:
   (a) a rigid frame disposed in a recess located in the backrest, said frame characterized by a pair of vertical braces secured to the backrest and frame of the automobile, said vertical braces disposed in substantially parallel, vertical relationship; a pair of bottom braces projecting from the ends of said vertical braces, respectively, in substantially parallel relationship and a bottom cross-brace connecting the extending ends of said bottom braces; a pair of top braces projecting from the opposite ends of said vertical braces, respectively, in substantially parallel relationship; a top cross-brace connecting the extending ends of said top braces; and a mount bar extending between said top braces; and wherein said support is hingedly attached to said bottom cross-brace;
   (b) a generally retangular-shaped, padded support positioned beneath said bottom cross-brace and said bottom braces of said frame;
   (c) hinge means connecting said support to said bottom cross-brace, wherein said support is foldable into said recess against said frame in a first configuration and from said recess in a second configuration;
   (d) a first flexible side flap extending between one side of said support and the backrest of the automobile seat and a second flexible side flap extending between the opposite side of said support and the backrest of the automobile seat, said first flexible side flap and said second flexible side flap foldable in the backrest with said support when said support is retracted in said first orientation;
   (e) a back support flap positioned in said recess and spanning said frame with one edge of said back support flap attached to said mount bar for bracing the child on said support; and
   (f) a seat belt and shoulder harness characterized by a crotch strap having one end secured to said support and the opposite end of said crotch strap provided with a buckle and a pair of shoulder straps, with one end of said shoulder straps joined together and provided with a lock plate and the opposite ends of said shoulder straps extending around said top cross-brace and attached to said frame and wherein said lock plate engages said buckle to secure the infant on said support.

15. The infant seat of claim 14 wherein said hinge means is a piano hinge having a first hinge bracket attached to said bottom cross-brace and a second hinge bracket attached to said support along a line substantially parallel to and spaced from the ends of said support, whereby said support engages said bottom braces and said bottom cross-brace in said seat frame when said support is extended outwardly of the backrest of the automobile seat into said second orientation and further comprising a second back support flap disposed between said support and said backrest, male snaps provided on the ends of said back support flap and female snaps provided on said support and the backrest, whereby said second back support flap is selectively positioned between said support and the backrest.

* * * * *